June 25, 1957  R. METER  2,796,707
ENDLESS CONVEYOR
Filed Dec. 29, 1953  3 Sheets-Sheet 1
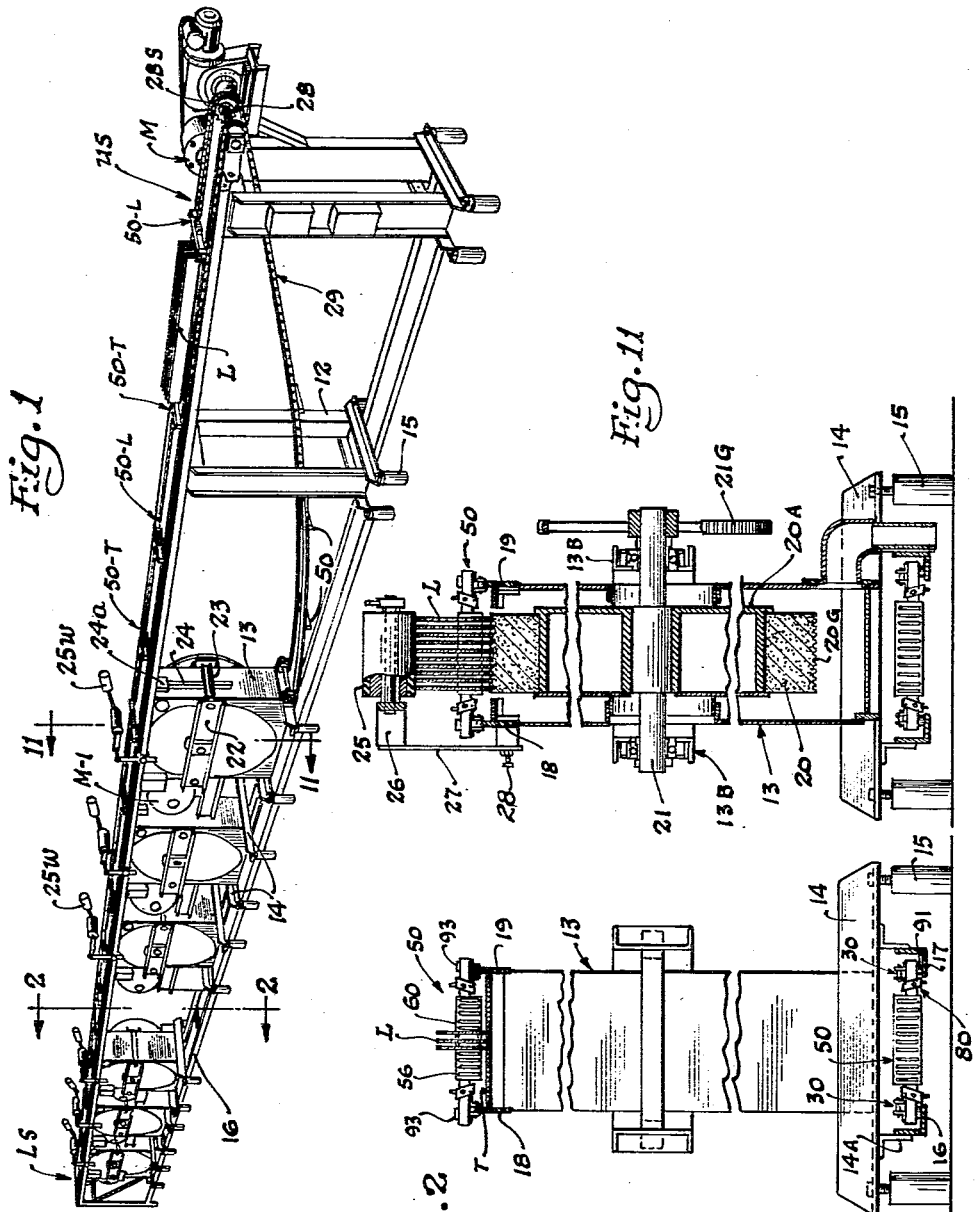
Inventor
Raymond Meter
By Wallace and Cannon
Attorneys June 25, 1957  R. METER  2,796,707
ENDLESS CONVEYOR
Filed Dec. 29, 1953  3 Sheets-Sheet 2
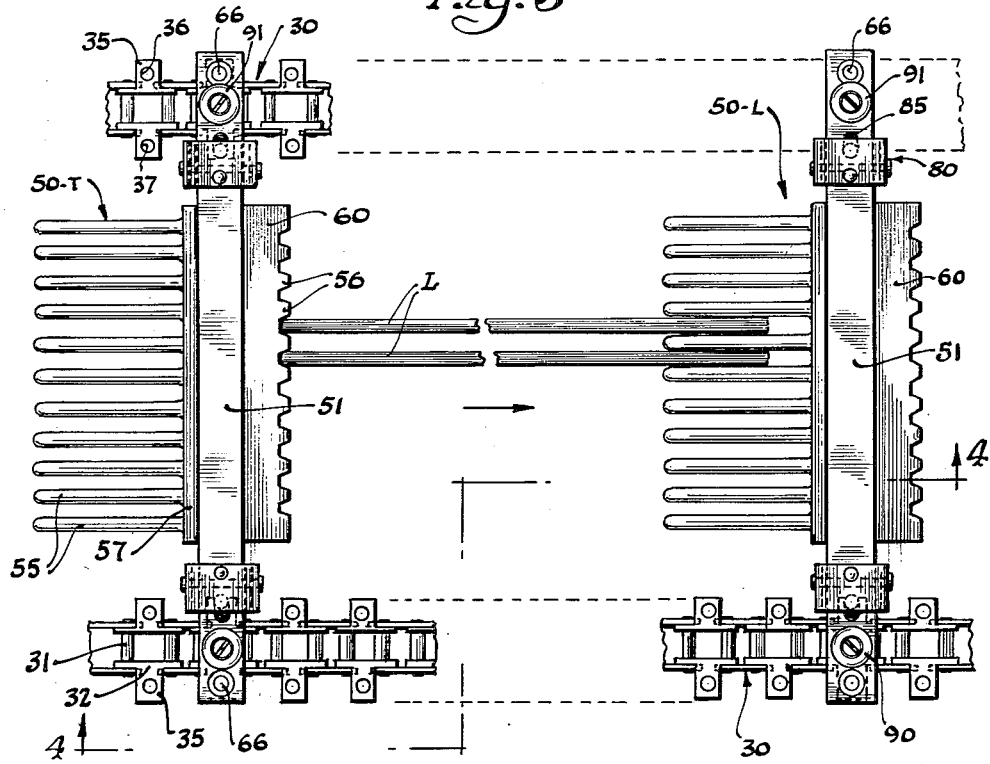
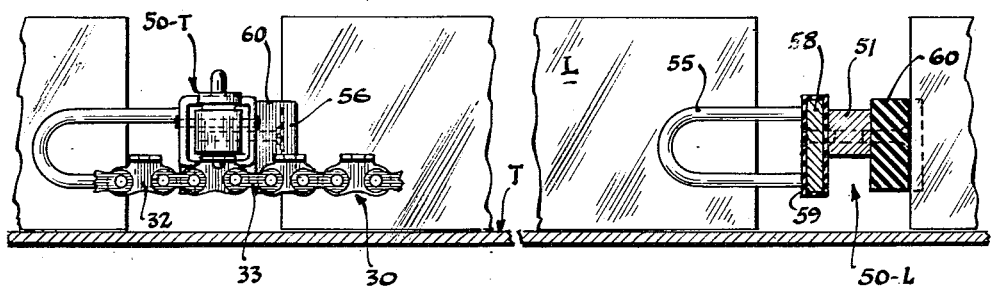
Inventor
Raymond Meter
By Wallace and Cannon
Attorneys June 25, 1957  R. METER  2,796,707
ENDLESS CONVEYOR
Filed Dec. 29, 1953  3 Sheets-Sheet 3
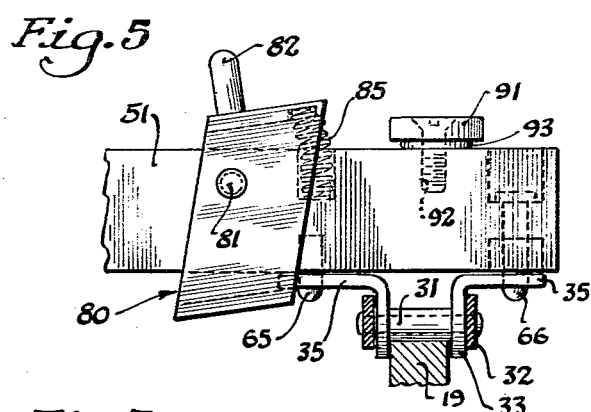
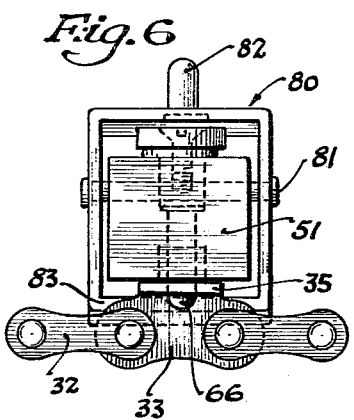
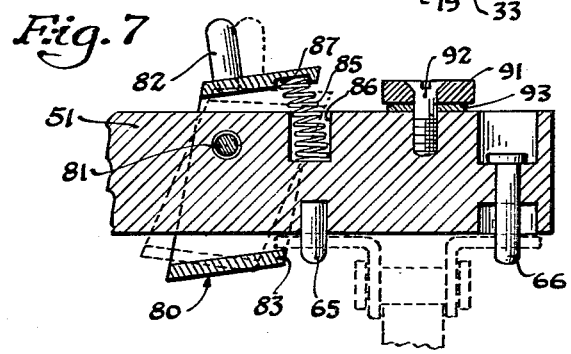
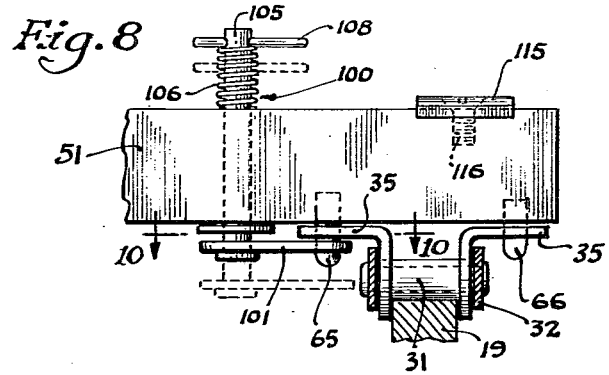
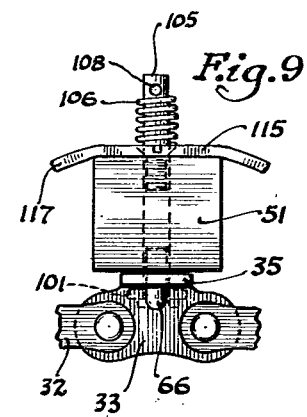
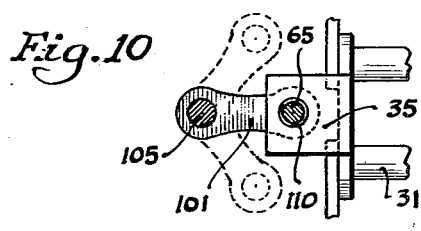
Inventor
Raymond Meter
By Wallace and Cannon
Attorneys

United States Patent Office 2,796,707
Patented June 25, 1957

2,796,707

ENDLESS CONVEYOR

Raymond Meter, Evergreen Park, Ill., assignor to Sommer & Maca Glass Machinery Co., Chicago, Ill., a corporation of Illinois Application December 29, 1953, Serial No. 400,905

9 Claims. (Cl. 51—215)

This invention relates to an endless conveyor that is to be used for conveying flat glass plates past a polisher or abrader for working on the edges thereof.

In the polishing or abrading of the edges of louver-like glass plates of a size to be used in jalousies, it is customary to arrange these panes in groups on a conveyor which is adapted to present the edges to the abrading machine. Such conveyors and the machine itself are relatively long and the practice in the past has been to assemble the panes in so-called pushers that are dismountably located on the conveyor. The pushers are then effective to advance the assembled panes as a group from the loading station to the abrading apparatus as the conveyor is caused to traverse the machine, and as the polishing of the edges of the panes is completed, the pushers are dismounted one by one from the conveyor at the opposite end of the machine, the finished panes are removed therefrom, and the pushers carried back to the starting or loading position where new groups of panes are started through the machine. It will be appreciated that this is a discontinuous process wherein the pushers are mounted on and dismounted from the conveyor and carried from one end of the machine to the other throughout the various abrading operations on different groups of the panes. The primary object of the present invention is to render these arduous and inefficient methods obsolete and to permit the pushers to travel endlessly with the conveyor from one end of the machine to the other and then back.

Under differing circumstances, it may be necessary to vary the distance between the pushers that are used to carry the panes past the abrading wheels of the machine, and another object of the present invention is to so construct the pushers that they may be located on the conveyor in preselected positions and may be easily relocated if necessary. In the carrying of the panes to be worked upon past the abrading mechanism, it is necessary that the panes be firmly gripped and supported against breakage in the pushers, and a further object of the present invention is to permit this to be satisfactorily achieved.

Other and further objects of the present invention will be apparent from the following description and claims and are illustrated in the accompanying drawings which, by way of illustration, show preferred embodiments of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention.

In the drawings:

Fig. 1 is a perspective view of a machine embodying the principles of the present invention;

Fig. 2 is a sectional view taken on the line 2—2 of Fig. 1;

Fig. 3 is a plan view, broken away, showing a portion of the conveyor with a bar of pushers embodying the principles of the present invention located thereon;

Fig. 4 is a sectional view taken on the line 4—4 of Fig. 3;

Fig. 5 is a detail elevational view, broken away, of a portion of the pusher;

Fig. 6 is an end view of Fig. 5;

Fig. 7 is a sectional view of Fig. 5;

Fig. 8 is a view similar to Fig. 5 showing the preferred form of the invention;

Fig. 9 is an end view of Fig. 8;

Fig. 10 is a view taken on the line 10—10 of Fig. 8; and

Fig. 11 is a sectional view taken on the line 11—11 of Fig. 1.

The present invention is illustrated in Figs. 1 to 11 as embodied in a machine of the kind shown in Fig. 1 adapted to grind and polish the top and bottom edges of panes L for jalousies. This machine is arranged for a progressive grinding action upon the panes assembled in groups in that there are two grinding stations, one for the bottom edges of the panes and one for the top edges, and these in turn employ a series of abrading wheels of progressive fineness. Thus the machine is relatively long in nature, embodying a long and relatively narrow table T, Fig. 2. At one end of this table there is a loading station LS, Fig. 1, where the panes to be worked upon are initially loaded on the conveyor of the machine. At the other end of the machine is an unloading station US where the finished panes are withdrawn, and the panes L are transported between these stations in groups on an endless conveyor 29 which in the present instance comprises a set of endless bands in the form of a set of spaced-apart link roller chains 30, Fig. 2.

The table T is supported in a raised position from the floor by vertical columns 12 and box-like housings as 13 which hold the abrading wheels, as will be pointed out below in more detail. These supporting members for the table of the machine in turn are supported by horizontal beams 14, and at either end the beams 14 embody feet 15 that rest upon the floor so that a rigid and stable superstructure for the machine is thereby afforded.

The conveyor 29 comprising the link chains 30 traverses the machine on rails 18 and 19, Figs. 2 and 5, arranged in parallel spaced relation on either side of the table T, and for driving this conveyor there is provided at the unloading station end of the machine a drive shaft 28 and corresponding sprockets 28S driven through suitable mechanism including a motor M.

As noted above, the drive shaft 28 is located at the end of the machine corresponding to the unloading station, and it is here that the conveyor is inverted, reversing itself for return to the loading station. This, of course, represents the lower run or pass of the conveyor, and supported at the bottom of the machine on brackets 14A are a pair of spaced apart rails 16 and 17 for supporting and guiding this return run of the conveyor 29.

The conveyor 29 which consists of the roller chains 30, has removably mounted thereon a plurality of pushers 50 for the panes L as will be described in more detail hereinbelow. These pushers are arranged to transport the panes past the abrading means, and in the form of the invention shown in Fig. 1 these abrading means are arranged for progressive action on both the upper and lower edges of the panes L. Thus, abrading wheels as 20, Fig. 11, are arranged for rotation in respective housings as 13. A plurality of such abrading wheels are thus arranged so that a progressively finer abrading action may be applied to both edges of the glass panes L. Two batteries of such abrading wheels, spaced substantially from one another, are employed in the present instance, as shown in Fig. 1, so that a progressive polishing action may be applied by the first three wheels as 20 on one edge of the panes L. The other three such wheels as 20 arranged further along in the machine are then utilized for the same type of action on the opposite edges of the same panes L worked on by the first group of wheels, this being accomplished simply by inversion of the panes L intermediate the two groups of wheels which are spaced sufficiently to permit this to be easily carried out.

The abrading wheels 20 each include on their outer peripheries grooves as 20G each allocatable to a separate one of the panes L, and as shown in Fig. 11 the table T is cut away above each wheel so that the downward facing edges of the panes L may be exposed to the separate wheels 20. The abrading wheels are secured on a rigid circular frame 20A which in turn is mounted upon a drive shaft 21, and this assembly is driven through a motor as M-1 and suitable drive mechanism for driving a large drive gear 21G that is secured to one end of the drive shaft 21. The wheel and drive shaft thus afforded are supported for rotation in bearings as 13B at either side of the housing 13 that encases the abrading mechanism. Bearing supports in the form of rather large channel bars 22 are afforded on opposite sides of the housings 13 to support the bearings for the drive shafts as 21, and these bearing supports 22 are in turn connected together at their opposite ends by bars 23. The bars 23 in turn are suspended on mounting bars 24 which are attached at their upper ends to mounting brackets as 24a fixed to the underside of the table T. In this manner, a relatively rigid and efficient bearing suspension is afforded for the individual abrading wheels.

The panes L as they travel over and in engagement with the abrading wheels as 20 are firmly pressed against such abrading means by pressure rollers 25 which are preferably covered with rubber or some similar resilient surface facing. These pressure rollers are supported for rotation in a horizontal plane at one end of a generally horizontal support arm 26, the latter being connected to a vertical support arm 27. The vertical arm 27 is adjustably mounted in a clamp as 28 that is provided at the side of the machine adjacent the rail 18. With this arrangement, the pressure roller 25 may be adjusted vertically to accommodate differently proportioned glass panes, and in order that alterations may be made at the same time in the amount of pressure thus applied to the glass panes, weights as 25W, Fig. 1, are attached to the pressure rollers at the side thereof opposite the support arms 26. These weights 25W are arranged to cause the pressure rollers to bear with some force against the glass panes to assure firm and even abrasion, and the weights 25W are preferably adjustable relative to the distance from the axis of each roller as 25 so that the effective torque arm and, therefore, the pressure of the pressure rollers against the glass panes L may be selectively adjusted.

The present invention is concerned primarily with pushers 50, Fig. 2, of a particular kind for transporting the jalousie panes past the abrading mechanism, and as shown in Fig. 1 these pushers are arranged in spaced pairs on the conveyor 29 for carrying the panes L between them. Thus, in conveying the groups of louver panes L past the different abrading means, pushers of the kind shown in detail in Fig. 3 are utilized. For each set of glass plates as L, Fig. 3, there is a leading pusher 50-L and a trailing pusher 50-T which are identical in construction, members at the front of the trailing pusher 50-T serving to grip the trailing edges of the glass panes, and members at the rear of the leading pusher 50-L serving to grip the leading edges of the glass panes L. Thus, each pusher embodies a transverse bar 51 which extends between and is connected at either end to the respective conveyor chains 30 in a manner to be described below. These bars included in the pushers as 50-L and 50-T serve as a support or suspension for the means that are utilized to grip the leading and trailing edges of the glass panes. In the present instance, the grippers for the leading edges of the glass panes take the form of a set of spaced apart vanes 55 which are U-shaped in form as shown in Fig. 4. Thus, the vanes 55 are in the form of U-shaped rods which project rearwardly from a flat horizontal plate 57 that in turn is mounted by means of screws, Fig. 4, to the rear face of the mounting bar 51. The vanes 55 are arranged in an accurately spaced relation with their legs disposed in vertical planes so that the leading edges of the glass plates may be pressed into the space thus afforded between the vanes. In this connection, the plate 57 is in the form of a plate 58 sheathed in a rubber cover 59, and the vanes 55 are likewise sheathed in the same rubber so that a tight non-slip gripping relation can be obtained on the glass plates.

For holding the trailing edges of the glass panes, a rubber block as 60 is fastened as by screws, Fig. 4, to the forward face of the pusher mounting bar 51, and this rubber block is provided with a set of spaced apart vertical ribs 56. These ribs are preferably tapered and so related with respect to one another that the trailing ends of the glass panes may be securely mounted in the spaces between. Thus, the vanes 55 in a forward pusher serve to accommodate the leading ends of the glass panes, and the ribs 56 in a rearward pusher serve to accommodate the trailing ends of the same group of panes. In this manner, individual glass panes can be assembled as a set between the respective grippers 55 and 56 of a pair of pushers as 50-L and 50-T and securely held therein against breakage while being carried past the polishing or abrading means of the machine on the conveyor as 29.

Under and in accordance with the present invention the pushers 50-L and 50-T as shown in Fig. 3 are mounted on the conveyor chains 30 in such a manner that the pushers will not drop off when the chain is inverted by the drive sprockets 28S for the return run along the rails 16 and 17 to the loading station LS. At the same time, the means for thus mounting the pushers on the conveyor are arranged relative to the chains 30 so that the pushers may be located in any preselected position. To obtain these results, the conveyor chains 30 utilized are of a conventional link type which includes the usual rollers 31 mounted in related pairs between sets of spaced links 32 that in turn are pivotally interconnected in the usual fashion by spaced apart connecting links 33. As shown in Figs. 2, 5 and 7, these rollers engage the rails 18 and 19 at the top of the machine in the usual fashion, but in the present instance the chains 30 are additionally adapted to support the pushers as 50-L and 50-T. This is attained by the provision of latches at either end of the pushers for releasably locking the same to the conveyor bands 30. One kind of latch for this purpose is illustrated in Figs. 3 to 7 as being in the form of a pair of spring-biased collars 80, Fig. 5, of general rectangular shape which are pivotally mounted on either end of the mounting bar 51 in position to releasably grip ears as 35 which project from the inner edges of conveyor chains. This is conveniently arranged by provision of ears 35 integral with the chain links 33 which serve to carry the chain rollers 31 so that right angled ears 35 project in horizontal planes from opposite sides of each of the links 33. These ears each include a pair of mounting openings as 36 and 37, Fig. 3, in position to receive a corresponding set of mounting pins 65 and 66 arranged in identical spaced relation, as shown in Fig. 5, at the underside of the mounting bar 51 at either end thereof. In this manner, the pushers as 50-L and 50-T can be arranged between the chains 30 with the pins as 65 and 66 mounted in the ears 35, and each set of opposite links on the chains 30 represents a different mounting position for the pushers 50. Accordingly, any set of link ears 35 may be selected for mounting a pusher. Any convenient method may be resorted to for providing the pins 65 and 66 at the underside of the pusher bars 35, and the use of two such pins provides a relatively rigid arrangement for the pushers as will be appreciated from Fig. 3.

Were the mounting pins 65 and 66 on the pushers to be simply set in the link ears 35 as described above, the pushers would have to be removed from the conveyor, for otherwise the pushers would drop off the conveyor as the latter passes about the drive shaft 28. Under and in accordance with the present invention, the pushers as 50–L and 50–T are each locked to the inner edges of the conveyor bands as the chains 30 by means of the latch collars 80 which are adapted to normally lock either end of a mounting bar 51 to a set of the link ears 35. These latch collars 80, which are of general rectangular shape, are telescoped over either end of the mounting bar 51 as best shown in Fig. 6, pins 81 serving to pivotally mount the latches 80 in place on the mounting bar 51. A finger pin as 82 is fixed to the top of each latch 80 to permit the latches to be manually opened as will be more apparent from the following description.

The bottom wall of each latch 80 is spaced substantially from the bottom of the mounting bar 51, and this relation permits the outer edge of the bottom wall of each latch collar to serve as a lip 83 for engaging a corresponding link ear 35. To permit this to be done in such a manner that the mounting bar 51 and, therefore, the corresponding pusher is locked on the conveyor, a relatively strong spring 85 is mounted in a recess 86 in the top wall by the bar 51 at a point removed from the pivot pin 81. The other end of this spring is seated in a compressed relation in a recess 87 in the top wall of the latch collar 80 so that the latter is normally urged counter-clockwise about the pivot pin 81, as viewed in Fig. 5, forcing the lip 83 at the outer bottom edge of the latch up against the inner edge of the conveyor band as represented by the free end of the link ear 35. Accordingly, the pusher is releasably locked to the chain, and when it is decided to remove or relocate the pusher relative to the conveyor chains the pins 82 at the top of the latches are grasped and rocked against the action of the springs 85, as illustrated in Fig. 7, to disengage the locking lip 83 from the conveyor, whereupon the pins 65 and 66 may be lifted out of the mounting openings 36 and 37, provided in the link ears of the conveyor.

During the return movement of the conveyor chains from the drive shaft 28 to the loading station LS of the machine, the pushers 50 travel along the guide rails 16 and 17 at the bottom of the machine as described above. To prevent wear of these engaging parts, spaced apart shoes 90 and 91 are fastened to the pusher mounting bars 51 adjacent the outer ends thereof. In the form of the invention shown in Figs. 3 to 7, these shoes are represented by wear-resistant discs or buttons fastened down as by screws 92, Fig. 5, with interposed washers 93 serving to prevent loosening of the shoes as the pushers 50 travel along the rails 16 and 17.

In Figs. 8 to 10, the present invention is illustrated in its preferred form wherein the mounting bars 51 of the respective pushers are again locked on the conveyor 29 with the mounting pins 65 and 66 locked in corresponding openings in the sets of link ears 35 by means of latch assemblies 100. Each latch 100 includes a latch plate or lip 101 arranged to engage a link ear 35 at either end of the pusher mounting bar 51. These lips 101 are adapted to be positioned in a locking relation on the link ears 35 and to this end are each fixed to the lower end of a latch shaft 105 which is extended through the pusher mounting bar 51 in a vertical relation allowing for free turning action of the shaft 105 relative to the mounting bar 51. A relatively strong spring 106 is mounted on the exposed upper end of the latch shaft 105, and this spring is tensioned between the top side of the mounting bar 51 and a pin 108 that extends through the shaft 105 at right angles thereto serving as a handle for turning the latch shaft. It will be recognized that the spring 106 tends to urge the latch shaft and the plate or lip 101 attached thereto upwardly against the bottom of the mounting bar 51. This action it will be seen, is similar to that of the lip 83 as acted upon by the spring 85, serving to hold the lip up against the edge of the conveyor band as represented by the link ears 35.

Thus, as shown in Fig. 10, the lip at the free end of the latch plate 101 is formed with an opening 110 of a diameter to receive the mounting pin 65 fixed in position at the bottom of the pusher mounting bar 51. By depression of the latch 100 against the action of the spring 106, the lip of the latch may be turned about below the pin 65 as indicated in Fig. 10, until the opening 110 therein is aligned with the mounting pin 65. The latch 100 may then be released to permit the lip 101 to engage the link ear on the pin 65, spring 106, of course, being sufficiently strong to assure that the pusher bar 51 is held on the conveyor 29 in this manner as the latter is inverted by the drive shaft 28 for return from the unloading to the loading station.

In the form of the invention shown in Figs. 8 and 9, the shoes for riding along the rails 16 and 17 at the bottom of the abraiding machine are in the form of elongated plates 115 that are mounted in position at either end of the pusher mounting bar 51 by means of flat-headed screws 115. The opposite ends of the shoes 115 are turned down as at 115, to facilitate movement of the shoes on the rails as can be readily envisioned.

From the foregoing, it will be seen that the present invention affords a pusher in a conveyor of the kind described which is adapted to hold plate glass planes in assembled groups, the grippers in each pusher serving to align the panes in spaced parallel relation. In this manner, the panes can be accurately conveyed past the abraiding mechanism. The pusher of the present invention also includes at either end a latch having a lip for engaging the edges of the conveyor, and this lip is biased, preferably by means of a spring, to thus hold the pusher releasably on the conveyor so that the pusher is retained against displacement when the conveyor is reversed from the upper to the lower run as by the drive sprockets 28S.

I claim:

1. In a conveyor comprising spaced apart endless bands having upper and lower runs for conveying glass plates arranged on edge past an abrading means or the like that is adapted to finish the edges of such glass plates, a pusher for cooperating with another like pusher to hold accurately a group of the glass plates thus on edge in spaced parallel upright relation one to the other and move the same past said abrading means in the upper run of the conveyor, said pusher comprising a mounting bar adapted to extend between said endless bands, a set of parallel grippers spaced from one another in a row on one side of the mounting bar to grip therebetween ends of one group of glass plates along opposite sides thereof, a second set of similarly spaced grippers on the other side of the mounting bar for holding the opposite ends of another group of glass plates along opposite sides thereof, said grippers in each set extending in opposed directions and including resilient facings to hold said glass plates against slip, a latch pivotally mounted at each end of said bar having a lip at the bottom thereof for engaging the conveyor bands in selected positions, a spring acting between said bar and the latch to releasably hold the latch lip on the conveyor bands against displacement when the conveyor reverses from the upper to the lower run, and means on the latch to permit the latch to be manually opened and closed against the action of said spring.

2. In an endless conveyor having upper and lower runs for conveying glass plates arranged on edge in substantially upright position, a pusher for supportingly engaging said plates to hold two groups of said plates in said position with said plates in each group disposed in spaced parallel relation to each other, said pusher comprising an elongated mounting bar adapted to extend across the conveyor transversely to such plates, a plurality of grippers mounted on said bar and projecting from one side thereof in spaced parallel relation to each other in position to grip the plates in one of said groups therebetween, a plurality of other grippers mounted on said bar and projecting from the side thereof opposite to said one side in longitudinal alignment with said first mentioned grippers in position to engage the plates of the other of said groups, and latch means pivotally mounted on said bar for releasably mounting said pusher in a selected position on said conveyor and holding said pusher in said selected position against displacement during movement over both said upper and lower runs.

3. In a conveyor including two spaced endless bands having upper and lower runs for conveying glass plates arranged on edge in substantially upright position, a pusher for supportingly engaging two groups of said plates, said pusher comprising a mounting bar extending between said bands, a plurality of substantially vertically disposed vanes mounted on and projecting from one side of said bar in spaced parallel relation to each other in position to grip the ends of one group of said plates therebetween, a plurality of grippers mounted on and projecting from the side of said bar opposite to said one side in spaced relation to each other in position to holdingly engage the ends of another group of said plates, and latches pivotally mounted on said bar for releasably engaging each band in a selected position and holding said pusher in such position against displacement from said upper and lower runs.

4. In a conveyor including two endless bands disposed in substantially parallel spaced relation to each other and having upper and lower runs for conveying glass plates arranged on edge in substantially upright position, a pusher for supportingly engaging two groups of glass plates in position to hold said plates in said substantially upright position between the upper runs of said bands with the plates in each of said groups disposed in parallel spaced relation to each other, said pusher comprising a mounting bar extending between said endless bands, a plurality of grippers spaced from one another in a row, said grippers being mounted on and projecting from one side of said bar in position to supportingly engage the ends of said plates in one of said groups therebetween, a plurality of other grippers spaced from one another in a row, said other grippers being mounted on and projecting from another side of said bar in position to supportingly engage ends of said plates in the other of said groups, and latches pivotally mounted on said bar, each of said latches having a lip for engaging one of said conveyor bands in selected position, and means acting between said bar and said latch to releasably hold said pusher on said conveyor bands against displacement from the upper and lower runs thereof.

5. The combination according to claim 4 and wherein each of said latches includes a latch shaft pivotally mounted on said bar in a normally vertical position with the lip arranged at the lower end so as to be turned into and out of engagement with the corresponding edge of the conveyor band, and wherein a spring acts between the top of said bar and the upper end of each of said latch shafts to releasably hold said lip thereon in engagement with the corresponding conveyor band.

6. The combination according to claim 4 and wherein each of said latches is in the form of a rectangular collar of relatively larger dimension than said bar arranged on a horizontal pivot relative to the bar, and wherein a bottom edge of said collar serves as the lip for engaging the conveyor band.

7. In a conveyor including two spaced endless bands having upper and lower runs for conveying glass plates arranged on edge in a susbtantially upright position, a pusher for holding such glass plates in said position between said bands, said pusher comprising an elongated mounting bar extending between said bands, a set of grippers spaced from one another on one side of said bar in position to resiliently grip in non-slipping relation the ends of a group of said plates in position wherein said plates are disposed in substantially parallel relation to each other, a second set of similarly spaced grippers on the side of said bar opposite to said one side for holding the ends of another group of said plates in position wherein said last mentioned plates are disposed in substantially parallel spaced relation to each other and in substantially longitudinal alignment with the plates of said first mentioned group, and holding means, said holding means including a latch in the form of a collar mounted on a horizontal pivot at one end of said bar and including an edge at the bottom thereof adapted to releasably engage a corresponding one of said bands, in a selected position for holding said pusher in such selected position on the conveyor and against displacement from the upper and lower runs of said bands.

8. In a conveyor including spaced endless bands having upper and lower runs for conveying glass plates arranged on edge, a pusher for supportingly holding a plurality of glass plates in substantially upright position for movement by said bands along said upper runs, said pusher comprising a mounting bar extending between said bands, a plurality of grippers in the form of vanes disposed in vertical planes in a substantially horizontally extending row in parallel spaced relation to each other, said grippers projecting from one side of said bar in position to grip the ends of one group of said plates disposed in said upright position with each plate disposed between an adjacent pair of said grippers, a plurality of other grippers disposed in vertical planes in a substantially horizontally extending row and in parallel spaced relation to each other, said other grippers being mounted on and projecting from the side of said bar opposite to said one side in position to grip the ends of another group of said plates disposed in said upright position with each of said last mentioned plates disposed between an adjacent pair of said other grippers and in longitudinal alignment with one of said first mentioned plates, and two latches, each of said latches including an elongated latch shaft pivotally mounted at one end of said bar and a latch plate mounted on one end of said shaft, said latch plate having a lip thereon for releasably engaging one of said bands in selected position for releasably holding said bar against displacement from said band, said latch plate being rotatable with said shaft into and out of said releasable engagement with said band.

9. The combination according to claim 8 and in which each of said shafts extends through said bar, and which includes springs mounted on each of said shafts in position to yieldingly urge said lips thereon toward said engagement with said bands.

References Cited in the file of this patent

UNITED STATES PATENTS

| | | |
|---|---|---|
| 317,826 | McPherson | May 12, 1885 |
| 502,843 | Addison | Aug. 8, 1893 |
| 774,182 | Johnston | Nov. 8, 1904 |
| 1,016,190 | White | Jan. 30, 1912 |
| 1,130,377 | Collis | Mar. 2, 1915 |
| 1,539,808 | Allsop | May 26, 1925 |
| 1,571,985 | Weber | Feb. 9, 1926 |
| 1,930,621 | Meyer | Oct. 17, 1933 |
| 2,439,040 | Cohen | Apr. 6, 1948 |
| 2,572,355 | Kintz | Oct. 23, 1951 |